(12) United States Patent
Bhattacharjee et al.

(10) Patent No.: US 8,019,738 B2
(45) Date of Patent: Sep. 13, 2011

(54) USE OF FIXED FIELD ARRAY FOR DOCUMENT RANK DATA

(75) Inventors: Shivajee Bhattacharjee, Newark, CA (US); William Alan Press, Berkeley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 416 days.

(21) Appl. No.: 12/133,895

(22) Filed: Jun. 5, 2008

(65) Prior Publication Data
US 2008/0319988 A1    Dec. 25, 2008

Related U.S. Application Data

(60) Provisional application No. 60/942,951, filed on Jun. 8, 2007.

(51) Int. Cl.
*G06F 7/00* (2006.01)
*G06F 17/00* (2006.01)

(52) U.S. Cl. .................................................. 707/696

(58) Field of Classification Search .................. None
See application file for complete search history.

(56) References Cited

U.S. PATENT DOCUMENTS

2005/0165838 A1* 7/2005 Fontoura et al. .......... 707/104.1
* cited by examiner

*Primary Examiner* — Uyen T. Le
(74) *Attorney, Agent, or Firm* — Kilpatrick Townsend & Stockton LLP

(57) ABSTRACT

An archive in a computer based search server can include a fixed-width field array storing numeric rank data associated with documents. The search server can provide search results using the numeric rank data obtained from the fixed-width field array.

15 Claims, 6 Drawing Sheets fixed-width field array

| 30 | 10 | 15 | 27 | 16 | ... | ... | ... | update rank of document 2 to 5 fixed-width field array

| 30 | 5 | 15 | 27 | 16 | ... | ... | ... |

USE OF FIXED FIELD ARRAY FOR DOCUMENT RANK DATA

CLAIM OF PRIORITY

This application claims priority from the following application, which is hereby incorporated in their entirety: U.S. Provisional Patent Application No.: 60/942,951 entitled "METHOD FOR CREATING A PERSISTENT, SCALE-ABLE, RAPIDLY-UPDATE STORAGE AND RETRIEVAL OF RELEVANCY RANKING META DATA", by Bhattacharjee. et al., filed on Jun 8, 2007.

BACKGROUND

Inverted Indexes are a way to process documents for effective document search. Inverted Indexes typically use token values for words in the document. These tokens are then arranged in order along with associated indications of what documents contain the token (word). The search for words in documents then becomes an ordered search for the tokens in the Inverted Index. This is less computationally expensive than a search of all the documents at search time, but the creation of the Inverted Index can take significant amounts of time.

DETAILED DESCRIPTION

Figure 1:
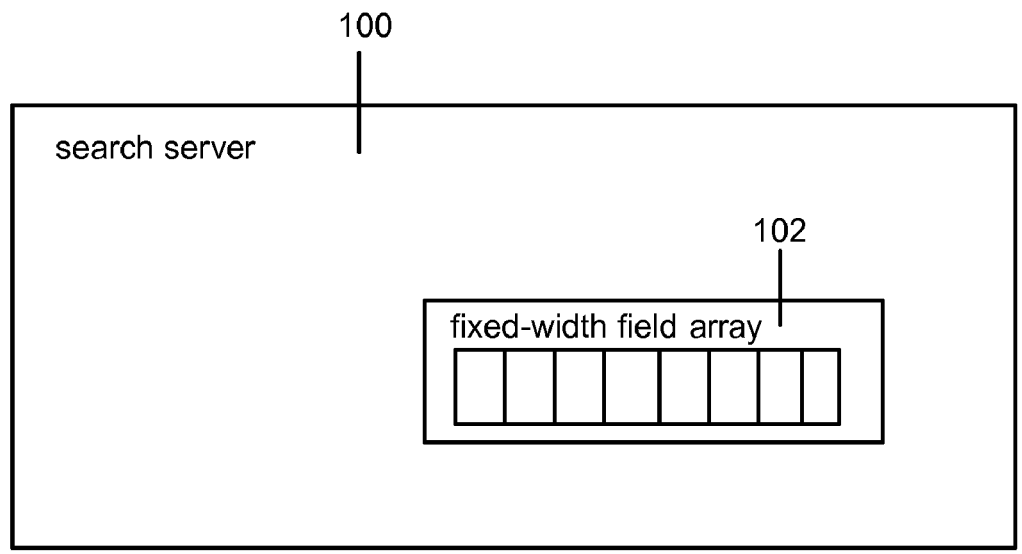
FIG. 1 shows a search server using a fixed-width field array.

FIG. 1 shows an exemplary search server using a fixed-width field array.

A computer based system 100 can use a fixed-width field array 102 storing numeric rank data associated with documents. The system 100 can provide result data using the numeric rank data obtained from the fixed-width field array.

The use of a fixed-width field array 102 can speed up the updating of an archive with the numeric rank data. Rank data can be quickly accessed and updated in the fixed-width field array 102.

Figure 2:
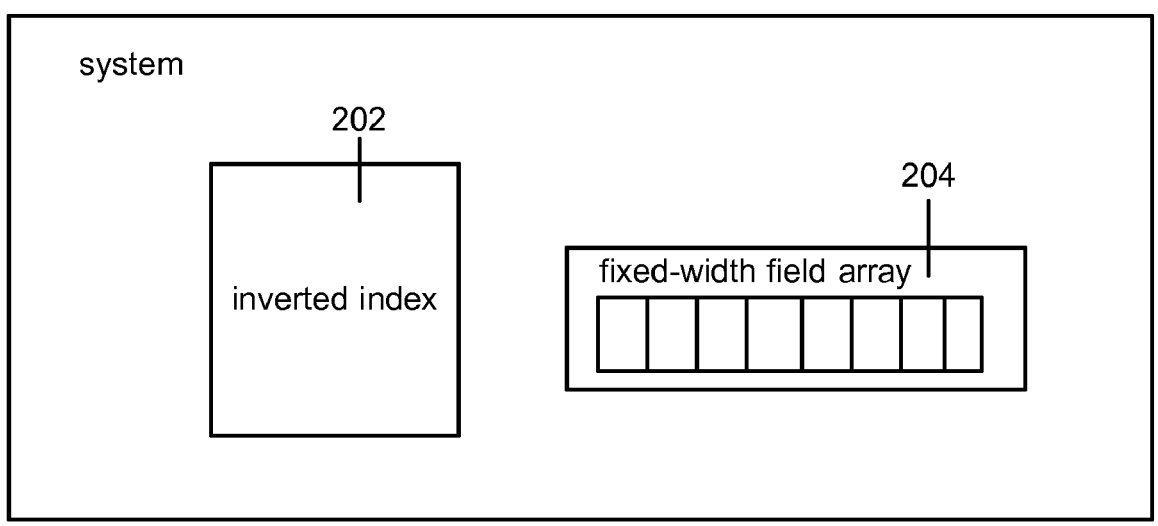
FIG. 2 shows an embodiment with an inverted index used in conjunction with a fixed-width field array.

FIG. 2 shows an embodiment with an inverted index used in conjunction with a fixed-width field array.

A computer based system 200 can comprise an inverted index 202 for a number of documents and a fixed-width field array 204 storing data associated with documents. The system can provide result data using the information obtained from the fixed-width field array.

The use of the fixed-width field array 204 with the inverted index 202 can avoid the need to do a costly update of the inverted index in some cases.

Figure 3:
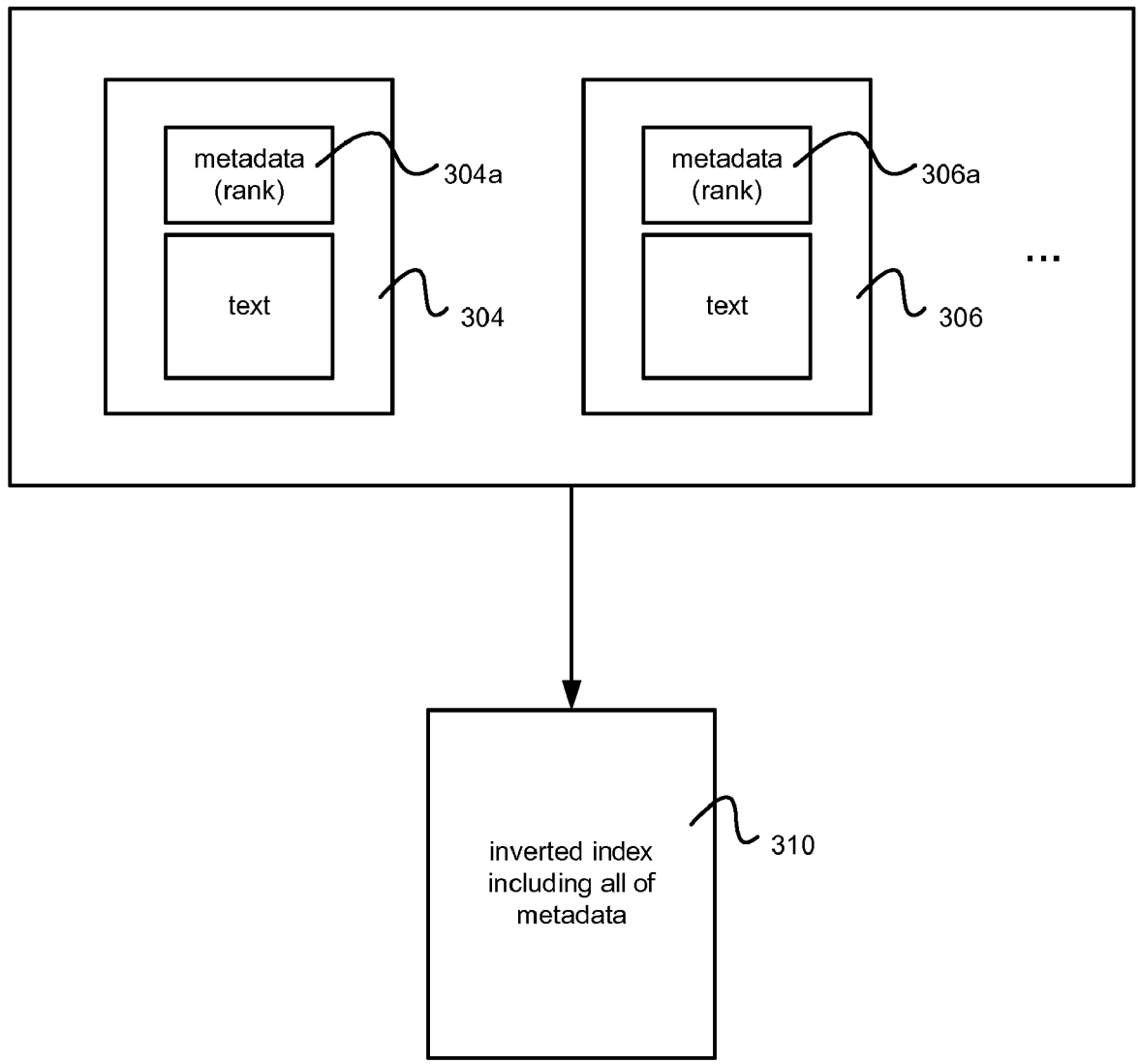
FIG. 3 shows a search system where all metadata associated with a document is used to create an Inverted Index.

FIG. 3 shows an example of a system where an archive includes documents 304 and 306. The metadata associated with documents, such as metadata 304a and 306a, can be put in the Inverted Index 310. This allows for searches to find documents based on tags or other metadata such as author information.

One disadvantage is that frequently updated metadata could cause significant computational efforts. One example of such frequently updated metadata is metadata for Document Rank. Document Rank can be used in a search system to indicate a search-independent ranking of the document. Some documents can be ranked higher due to the importance of the authors, number of users or other factors. An example of such a system is given in the patent application "USING CONNECTIONS BETWEEN USERS AND DOCUMENTS TO RANK DOCUMENTS IN AN ENTERPRISE SEARCH SYSTEM" Ser. No. 11/461,549 that is incorporated herein by reference.

Figure 4A:
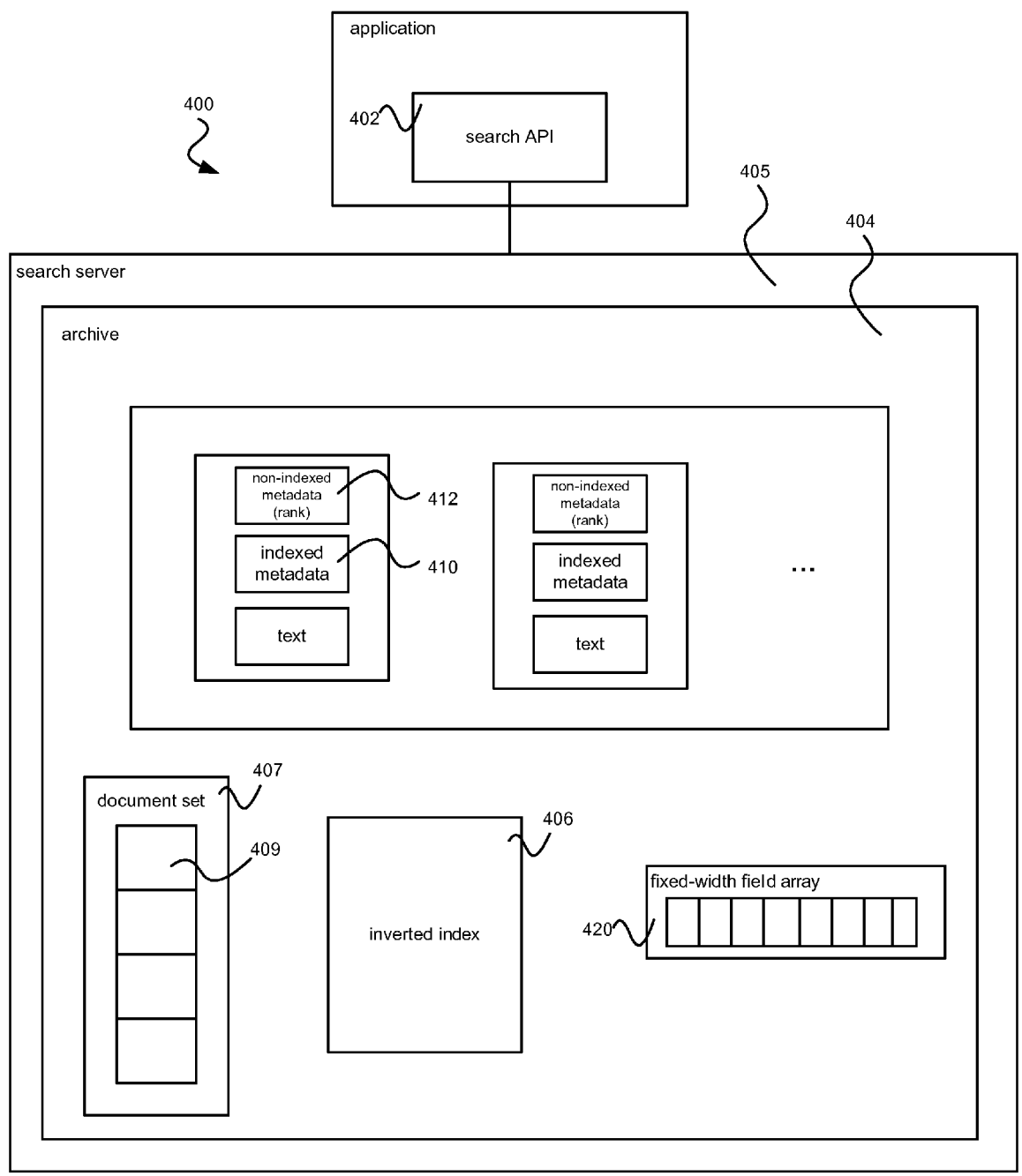
FIG. 4A shows a search system wherein some metadata fields associated with a document are not used to create an Inverted Index.

FIG. 4A shows computer based search server 405 including an archive 404 including an inverted index 406 for a number of documents and a fixed-width field array 420 storing data associated with the documents. The search server 405 can provide search results using information obtained from the fixed-width field array 420.

The use of a fixed-width field array can allow frequently updated metadata to not require a re-indexing of the inverted index.

A search API 402 at application 403 can be used to access data in the search server 405 containing an archive 404. The search server 405 can be adapted to find documents matching a search criterion.

In one example, the non-indexed field data can be in a fixed-width field array 420. This fixed width field array can be memory-mapped or accessed in another manner. Position in the array 420 can correspond to the document number. This makes the updating and search of the array very simple.

The non-indexed field value can be a rank value such as a search-independent rank value. In this way, the search-independent rank can be frequently updated for every document without causing the re-indexing of the inverted index.

In one embodiment, the fixed-width field arrays can be used for any numeric value used for any purpose associated with the search engine (including simply returning values to the users). For example, a catalogue company may change prices frequently and want to store them within the search engine but not within the inverted index.

The inverted index can be searched using search terms to obtain a search-dependent rank. The search-dependent rank can be combined with search-independent rank, such as values that stored in fixed-width field array 420, to get an overall rank value.

In one embodiment, there can be multiple fixed-width field arrays that store multiple values.

Searches can be done by accessing both the inverted index and the fixed-width field array.

In one embodiment, the fixed-width field array can be created automatically when a fixed-width field, such as a number field, is to be associated with documents. Examples other than rank can include price, time, size value or other such values.

In the example of FIG. 4A, the document data in the inverted index 406 can include at least some metadata 410; and at least some documents, can have at least one field 412 that is not placed in the inverted index.

Figure 4B:
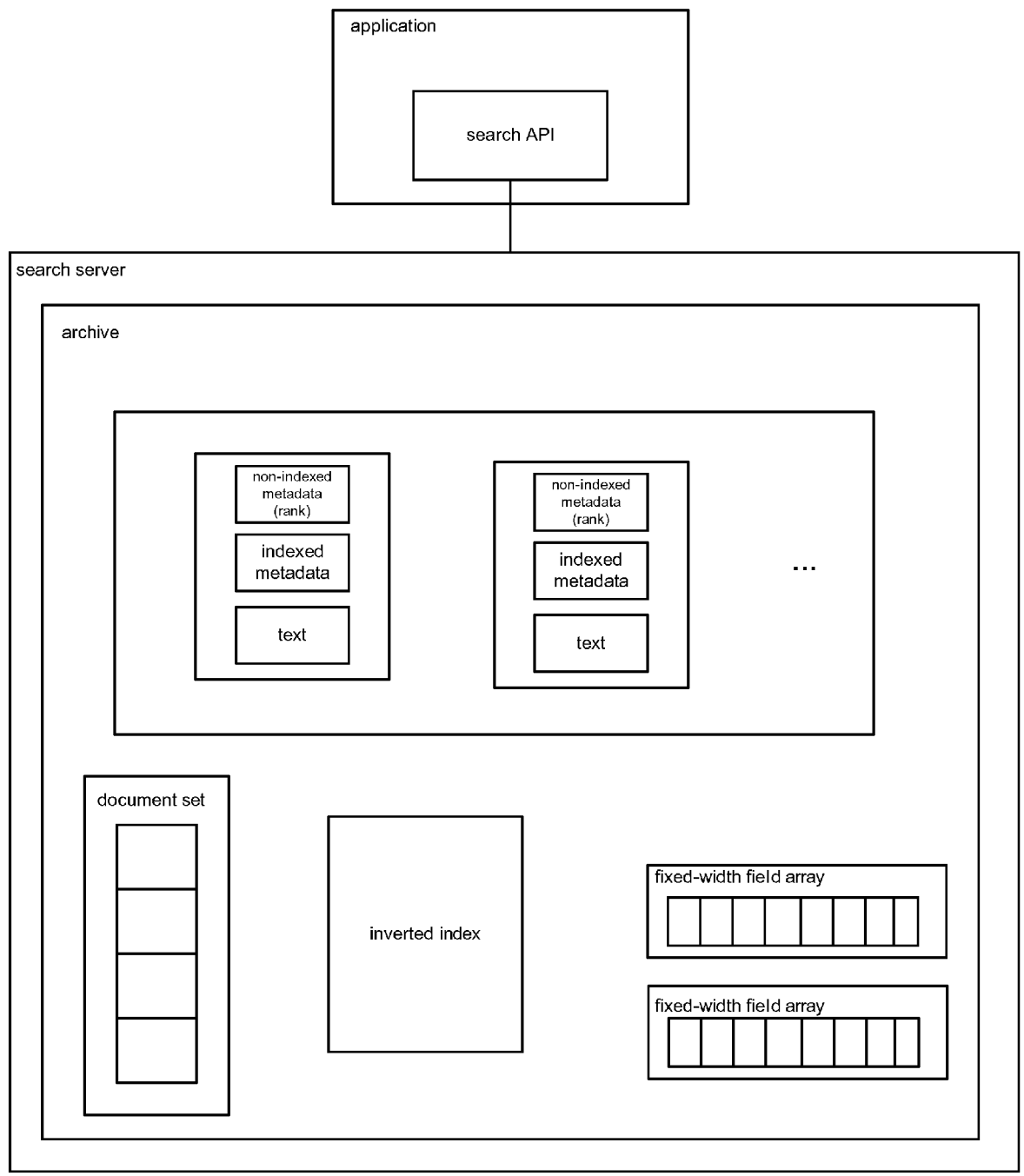
FIG. 4B shows another example with multiple fixed-width field arrays.

FIG. 4B shows an example with multiple fixed-width field arrays. The multiple fixed-width field arrays can store different field data.

Figure 5:
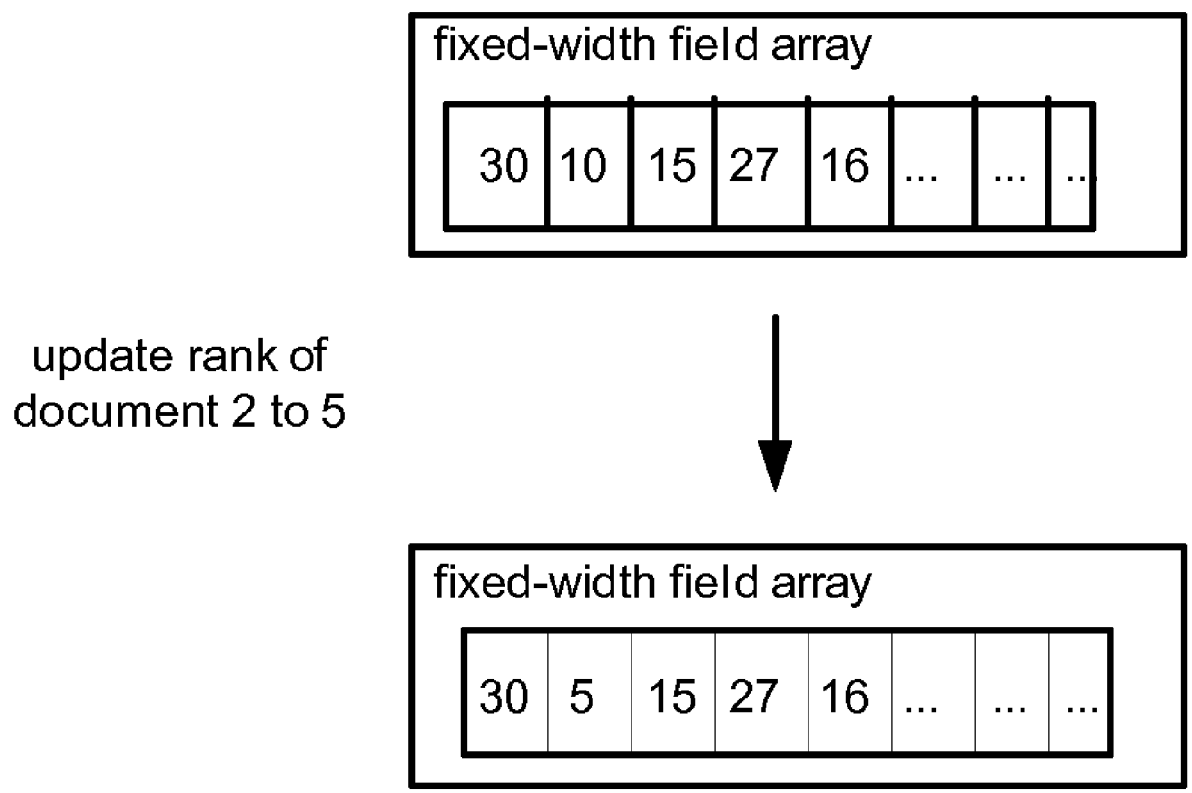
FIG. 5 shows an example of the updating of a fixed-width field array.

FIG. 5 is an example that shows an update of a fixed-width field value. Rather than requesting a reordering of the inverted index, the value in a fixed-width field array can be easily accessed and modified. Certain higher level languages make such accessing and updating very simple.

In one embodiment, for example, if each fixed-width field is 4 bytes, then

Fixed-width field address=array starting address+4 (document number)

Figure 6:
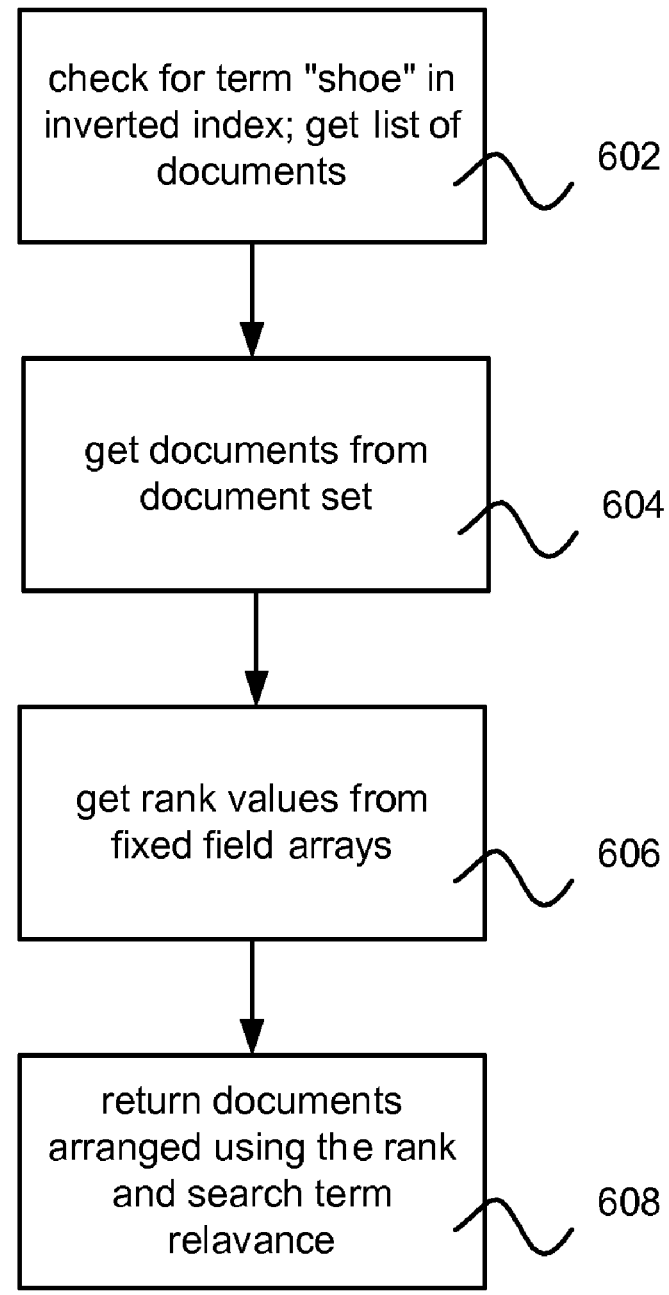
FIG. 6 shows a flow chart illustrating a method of the present invention.

FIG. 6 shows an example of the accessing of the data by a search system. In this example, a search for the term "shoe" is done.

In step 602, the inverted index is checked for the term "shoe" in the inverted index 406. This gets a list of document numbers. In step 604, the documents associated with the document numbers from the document set 407 are obtained. In steps 606, the rank values (or other fixed-width field data) are obtained from fixed-width field array 420.

In step 608, the search returns can be provided to the user. The search results can be returned using the rank values obtained from the fixed-width field array.

The fixed-width field array can be memory mapped. A field can represent its values in an array, where the values are indexed in array by document number. This array can be persisted on disk, and memory-mapping can be used to access this on-disk array as if it were an in-memory data structure. This can allow for both efficient access and efficient updating of the field's values.

Exemplary Non-Limiting Example

An exemplary non-limiting example is described below.

In one embodiment, users can update field values without having to modify the inverted index, which is computationally expensive (as modifying values in the inverted index requires first deleting a document, then re-indexing the new version of the document, and finally recreating the inverted index). This feature can be used for storing and updating values associated with document rank, such as graffiti-rank; in this case, the field value is of fixed width. In one embodiment, a memory-mapped numeric field is a vector indexed by the document number, and the value it holds is the document's rank value. Thus, a memory-mapped data structure can be used to store the fixed-width field values separately from the inverted index data structure.

In one example, the API and Search Server can represent c field types that are supported as memory-mapped on the search server for fast update. In one example, these field types can be 32-bit integers and floating point numbers (int32 and float, respectively). Note that other fixed-width data types could be supported as well (such as uint32, double, int64, and uint64, to name just a few), though they are not described in this example.

The Search Server can use type names sent from the API to determine whether the associated value should be added to the Inverted Index or to the fixed-width field array.

In one embodiment, a given document can contain any number of numeric field instances. To send documents to the Search Server, the API can bundle one or more documents in a document set object, also known as a "docset". When a docset is sent to the Search Server, the API is said to make an "IndexRequest". This can be for adding/replacing documents in the Search Server, updating fields in existing documents in the Search Server, or removing documents from the Search Server.

When the IndexRequest arrives at the Search Server, it can be parsed. Each document in the docset can then be represented by a ParseDocument object. In addition to having a data structure for holding the document's numeric field values, it can also have a flag for keeping track of whether the document contains only fast-update fields. This flag can be referred to as the "fastupdateOnly" flag, and any document for which this flag is true is referred to as a "fastupdateOnly" document.

If queries are prevented from reading the fast-update fields while index requests are being processed, then each document can be processed in the manner appropriate to that document: fastupdateOnly documents can be updated simply by changing the associated value in the fixed-width fast-update (i.e., non-indexed) field, whereas all other documents must be updated in the manner appropriate for updating the inverted index (i.e., deleting the original document, adding the modified document, and recreating the inverted index).

If queries are not prevented from reading the fast-update fields while index requests are being processed, then, in one embodiment, the system can be more conservative about modifying the memory-mapped fast-update fields. Exemplary precautions are described below.

In one embodiment, if live queries are running against the one copy of the memory-mapped data structure(s), then only existing values can be updated. Appending new values to the data structure(s), which can occur when adding new documents or adding new field instances, could result in live queries running against an invalid data region, since the memory-mapped field would have to be un-mapped and then re-mapped upon resizing or creating a new instance of the field.

Thus, when processing update requests, we can loop through each document in the docset to check if it's a fastupdateOnly document or not. If any of them are not a fastupdateOnly document, the entire request should be treated as a regular (i.e., non-optimized) update request (that is, by marking the previously existing document in the Search Server as deleted and re-indexing the entire new document).

If all of the documents in the docset are fastupdateOnly, then we are dealing with memory-mapped-only update request. Then, we can see if a memory-mapped field instance already exists for the document number. If so, would be able to update this value. If the memory-mapped field doesn't exist, then could add the field value using a regular update request.

If all of the documents are fastupdateOnly documents and memory-mapped field instances exist for each of the fields in the range of the documents being updated, the fast-update field values can be changed directly without any other processing. In this case, queries could be running against the fast-update fields concurrent with the changes being made. They would read the most up-to-date value in the fast-update field, depending upon the timing of the query and the update request.

If documents are added using a regular update request, newly added documents or field instances could be incorporated into the existing index during a merge operation. This merge operation could occur at a later time than the documents' being indexed, and it could involve taking a mutually exclusive lock that prevents query requests or index requests from accessing either the inverted index or the memory-mapped data structures.

Each archive can contain several memory-mapped field instances. These can be represented by a map of memory-mapped field instances keyed by the fieldnames.

The goal here was to provide scoring by memory-mapped fields as no different as when scoring with non-memory-mapped numeric field values. So, during scoring we use the lexicon to determine if we are dealing with a memory-mapped field and then use that to get the value of the memory-mapped field.

Embodiments of the present invention can include computer-based methods and systems which may be implemented using conventional general purpose or a specialized digital computer(s) or microprocessor(s), programmed according to the teachings of the present disclosure. Appropriate software coding can readily be prepared by programmers based on the teachings of the present disclosure.

Embodiments of the present invention can include a computer readable medium, such as computer readable storage medium. The computer readable storage medium can have stored instructions which can be used to program a computer to perform any of the features present herein. The storage medium can include, but is not limited to, any type of disk including floppy disks, optical discs, DVD, CD-ROMs, micro drive, and magneto-optical disks, ROMs, RAMs, EPROMs, EEPROMs, DRAMs, flash memory or any media or device suitable for storing instructions and/or data. The present invention can include software for controlling both the hardware of a computer, such as general purpose/specialized computer(s) or microprocessor(s), and for enabling them to interact with a human user or other mechanism utilizing the results of the present invention. Such software may include, but is not limited to, device drivers, operating systems, execution environments/containers, and user applications.

Embodiments of the present invention can include providing code for implementing processes of the present invention. The providing can include providing code to a user in any manner. For example, the providing can include transmitting digital signals containing the code to a user; providing the code on a physical media to a user; or any other method of making the code available.

Embodiments of the present invention can include a computer-implemented method for transmitting the code which can be executed at a computer to perform any of the processes of embodiments of the present invention. The transmitting can include transfer through any portion of a network, such as the Internet; through wires, the atmosphere or space; or any other type of transmission. The transmitting can include initiating a transmission of code; or causing the code to pass into any region or country from another region or country. A transmission to a user can include any transmission received by the user in any region or country, regardless of the location from which the transmission is sent.

Embodiments of the present invention can include a signal containing code which can be executed at a computer to perform any of the processes of embodiments of the present invention. The signal can be transmitted through a network, such as the Internet; through wires, the atmosphere or space; or any other type of transmission. The entire signal need not be in transit at the same time. The signal can extend in time over the period of its transfer. The signal is not to be considered as a snapshot of what is currently in transit.

The forgoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. For example, steps preformed in the embodiments of the invention disclosed can be performed in alternate orders, certain steps can be omitted, and additional steps can be added. The embodiments were chosen and described in order to best explain the principles of the invention and its practical application, thereby enabling others skilled in the art to understand the invention for various embodiments and with various modifications that are suited to the particular used contemplated. It is intended that the scope of the invention be defined by the claims and their equivalents.

The invention claimed is:

1. A computer based search server comprising:
a memory;
a processor configured to execute instructions stored in the memory, the instructions configured to cause the processor to:
receive a search term;
search an inverted index stored in the memory using the search term to obtain one or more document numbers associated by the inverted index with the search term, the one or more document numbers further associated with one or more corresponding documents that include the search term;
retrieve one or more rank values for the documents from a fixed-width field array stored in the memory, wherein each array position corresponds to one of the document numbers, and the rank value of each document number is stored at the array position that corresponds to the document number, and
wherein the rank values specify an ordering of the document numbers and are indexed in the fixed-width field array by the document numbers; and
provide search results comprising indicia of the one or more corresponding documents ordered in accordance with the rank values.

2. The computer-based search server of claim 1, wherein the fixed-width field array is memory-mapped.

3. The computer based search server of claim 1, wherein updating values associated with document rank modifies the fixed-width field array without modifying the inverted index.

4. The computer based search server of claim 1, wherein the search results are provided to a user.

5. The computer based search server of claim 1 , wherein the rank values are combined with search relevance data to produce the order of search results.

6. A non-transitory computer readable storage medium storing a plurality of instructions executable by a processor, the plurality of instructions comprising:
instructions that cause the processor to receive a search term;
instructions that cause the processor to search an inverted index using the search term to obtain one or more document numbers associated by the inverted index with the search term, the one or more document numbers further associated with one or more corresponding documents that include the search term;
instructions that cause the processor to retrieve one or more rank values for the documents from a fixed-width field array, wherein each array position corresponds to one of the document numbers, and the rank value of each document number is stored at the array position that corresponds to the document number, and
wherein the rank values specify an ordering of the document numbers and are indexed in the fixed-width field array by the document numbers; and
instructions that cause the processor to provide search results comprising indicia of the one or more corresponding documents ordered in accordance with the rank values.

7. The non-transitory computer readable storage medium of claim 6, wherein the fixed-width field array is memory-mapped.

8. The non-transitory computer readable storage medium of claim 6, wherein updating values associated with document rank modifies the fixed-width field array without modifying the inverted index.

9. The non-transitory computer readable storage medium of claim 6, wherein the search results are provided to a user.

10. The non-transitory computer readable storage medium of claim 6, wherein the rank values are combined with search relevance data to produce the order of search results.

11. A method comprising:

receiving, by a computer system, a search term;

searching, by the computer system, an inverted index using the search term to obtain one or more document numbers associated by the inverted index with the search term, the one or more document numbers further associated with one or more corresponding documents that include the search term;

retrieving, by the computer system, one or more rank values for the documents from a fixed-width field array, wherein each array position corresponds to one of the document numbers, and the rank value of each document number is stored at the array position that corresponds to the document number, and wherein the rank values specify an ordering of the document numbers and are indexed in the fixed-width field array by the document numbers; and providing, by the computer system, search results comprising indicia of the one or more corresponding documents ordered in accordance with the rank values.

12. The method of claim 11, wherein the fixed-width field array is memory-mapped.

13. The method of claim 11, wherein updating values associated with document rank modifies the fixed-width field array without modifying the inverted index.

14. The method of claim 11, wherein the search results are provided to a user.

15. The method of claim 11, wherein the rank values are combined with search relevance data to produce the order of search results.

* * * * *

UNITED STATES PATENT AND TRADEMARK OFFICE
CERTIFICATE OF CORRECTION

| | | |
|---|---|---|
| PATENT NO. | : 8,019,738 B2 | Page 1 of 1 |
| APPLICATION NO. | : 12/133895 | |
| DATED | : September 13, 2011 | |
| INVENTOR(S) | : Bhattacharjee et al. | |

It is certified that error appears in the above-identified patent and that said Letters Patent is hereby corrected as shown below:

On Title page, item [54] in column 1, Title, line 1, delete "FIXED" and insert -- FIXED-WIDTH --, therefor.

On Drawing Sheet 6 of 6, in figure 6, Box 608, line 4, delete "relavance" and insert -- relevance --, therefor.

In column 1, line 1, delete "FIXED" and insert -- FIXED-WIDTH --, therefor.

In column 1, line 11-12, delete "Bhattacharjee." and insert -- Bhattacharjee --, therefor.

In column 6, line 31, in Claim 2, delete "computer-based" and insert -- computer based --, therefor.

Signed and Sealed this
Third Day of January, 2012

David J. Kappos
*Director of the United States Patent and Trademark Office*